(12) United States Patent
Lepak et al.

(10) Patent No.: US 12,484,800 B2
(45) Date of Patent: Dec. 2, 2025

(54) SYSTEMS AND METHODS FOR CALIBRATING DRY ELECTRODE BIOELECTRICAL IMPEDANCE SENSING

(71) Applicant: TERUMO KABUSHIKI KAISHA, Tokyo (JP)

(72) Inventors: Clayton G. Lepak, San Francisco, CA (US); Reza Naima, San Francisco, CA (US)

(73) Assignee: TERUMO KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 18/335,953

(22) Filed: Jun. 15, 2023

(65) Prior Publication Data

US 2023/0337929 A1    Oct. 26, 2023

Related U.S. Application Data

(62) Division of application No. 16/714,594, filed on Dec. 13, 2019, now abandoned.

(Continued)

(51) Int. Cl.
  *A61B 5/0531* (2021.01)
  *A61B 5/00* (2006.01)
  *A61B 5/24* (2021.01)

(52) U.S. Cl.
  CPC .............. *A61B 5/0531* (2013.01); *A61B 5/24* (2021.01); *A61B 5/681* (2013.01); *A61B 2560/0238* (2013.01)

(58) Field of Classification Search
  CPC ......... A61B 5/0531; A61B 5/24; A61B 5/681; A61B 2560/0238

(Continued)

(56) References Cited

U.S. PATENT DOCUMENTS

| | | | |
|---|---|---|---|
| 5,971,930 | A | 10/1999 | Elghazzawi |
| 6,496,725 | B2 | 12/2002 | Kamada et al. |

(Continued)

FOREIGN PATENT DOCUMENTS

| | | | |
|---|---|---|---|
| CA | 2333062 A1 | 12/1999 | |
| CA | 2375249 A1 | 12/2000 | |

(Continued)

OTHER PUBLICATIONS

Notice of Reasons for Refusal mailed Oct. 31, 2023 in corresponding Japanese Patent Application No. 2021-532500, 4 pages (with Translation).

(Continued)

*Primary Examiner* — Alex M Valvis
*Assistant Examiner* — Chanel J Jhin
(74) *Attorney, Agent, or Firm* — Kim & Stewart LLP (57) ABSTRACT

Described herein are systems and methods for calibrating dry electrode bioelectrical impedance measurements. These method and apparatuses may be used for sensing bioelectrical impedance for ambulatory and or long-term measurements. Calibration of bioelectrical impedance sensing may be performed by using measurements taken during a shorted configuration of the apparatus, in which the same current is applied to both the source and sink stimulation electrodes, to modify measurements taken in a forward and/or reverse configuration in which current is applied to either the source and/or sink.

12 Claims, 3 Drawing Sheets

Related U.S. Application Data (60) Provisional application No. 62/779,657, filed on Dec. 14, 2018.

(58) Field of Classification Search
USPC .......................................................... 600/547
See application file for complete search history.

(56) References Cited

U.S. PATENT DOCUMENTS

| | | |
|---|---|---|
| 6,516,222 B2 | 2/2003 | Fukuda |
| 6,714,813 B2 | 3/2004 | Ishigooka et al. |
| 6,821,249 B2 | 11/2004 | Casscells, III et al. |
| 6,829,496 B2 | 12/2004 | Nagai et al. |
| 6,850,788 B2 | 2/2005 | Al-Ali |
| 6,896,661 B2 | 5/2005 | Dekker |
| 7,018,339 B2 | 3/2006 | Birnbaum et al. |
| 7,024,233 B2 | 4/2006 | Ali et al. |
| 7,215,987 B1 | 5/2007 | Sterling et al. |
| 7,547,279 B2 | 6/2009 | Kim et al. |
| 7,657,295 B2 | 2/2010 | Coakley et al. |
| 7,740,591 B1 | 6/2010 | Starr et al. |
| 7,761,261 B2 | 7/2010 | Shmueli et al. |
| 7,794,406 B2 | 9/2010 | Reisfeld et al. |
| 7,976,472 B2 | 7/2011 | Kiani |
| 8,092,393 B1 | 1/2012 | Rulkov et al. |
| 8,148,686 B2 | 4/2012 | Ryhanen et al. |
| 8,175,671 B2 | 5/2012 | Hoarau |
| 8,233,974 B2 | 7/2012 | Ward et al. |
| 8,328,718 B2 | 12/2012 | Tran |
| 8,346,328 B2 | 1/2013 | Mannheimer et al. |
| 8,374,688 B2 | 2/2013 | Libbus et al. |
| 8,401,608 B2 | 3/2013 | Baker, Jr. et al. |
| 8,433,383 B2 | 4/2013 | O'Neil et al. |
| 8,437,820 B2 | 5/2013 | Yarita |
| 8,600,468 B2 | 12/2013 | Yamamoto et al. |
| 8,721,555 B2 | 5/2014 | Westbrook et al. |
| 8,744,577 B2 | 6/2014 | Joo et al. |
| 8,836,345 B2 | 9/2014 | Chetham et al. |
| 8,886,271 B2 | 11/2014 | Kiani et al. |
| 8,903,484 B2 | 12/2014 | Mazar |
| 8,920,332 B2 | 12/2014 | Hong et al. |
| 8,945,017 B2 | 2/2015 | Venkatraman et al. |
| 8,954,135 B2 | 2/2015 | Yuen et al. |
| 8,956,303 B2 | 2/2015 | Hong et al. |
| 8,965,471 B2 | 2/2015 | Lamego |
| 8,974,396 B1 | 3/2015 | Brady et al. |
| 8,977,348 B2 | 3/2015 | Su et al. |
| 8,998,815 B2 | 4/2015 | Venkatraman et al. |
| 9,044,149 B2 | 6/2015 | Richards et al. |
| 9,044,171 B2 | 6/2015 | Venkatraman et al. |
| 9,049,998 B2 | 6/2015 | Brumback et al. |
| 9,113,794 B2 | 8/2015 | Hong et al. |
| 9,130,070 B2 | 9/2015 | Deliwala et al. |
| 9,149,235 B2 | 10/2015 | Ward et al. |
| 9,186,108 B2 | 11/2015 | Rodriguez-Llorente et al. |
| 9,192,310 B2 | 11/2015 | Rodriguez-Llorente et al. |
| 9,241,635 B2 | 1/2016 | Yuen et al. |
| 9,241,646 B2 | 1/2016 | Addison et al. |
| 9,247,884 B2 | 2/2016 | Yuen et al. |
| 9,289,167 B2 | 3/2016 | Diab et al. |
| 9,304,202 B2 | 4/2016 | Deliwala |
| 9,320,443 B2 | 4/2016 | Libbus et al. |
| 9,339,236 B2 | 5/2016 | Frix et al. |
| 9,504,406 B2 | 11/2016 | Chetham et al. |
| 9,675,250 B2 | 6/2017 | Tverskoy |
| 10,004,408 B2 | 6/2018 | Naima |
| 2001/0020138 A1 | 9/2001 | Ishigooka et al. |
| 2008/0214903 A1 | 9/2008 | Orbach |
| 2008/0319336 A1 | 12/2008 | Ward et al. |
| 2010/0217096 A1 | 8/2010 | Nanikashvili |
| 2012/0179006 A1 | 7/2012 | Jansen et al. |
| 2012/0253141 A1 | 10/2012 | Addison et al. |
| 2012/0283535 A1 | 11/2012 | Sarussi |
| 2013/0058358 A1 | 3/2013 | Fulton et al. |
| 2013/0072145 A1 | 3/2013 | Dantu |
| 2013/0261415 A1 | 10/2013 | Ashe et al. |
| 2013/0281800 A1 | 10/2013 | Saroka et al. |
| 2013/0303935 A1 | 11/2013 | Uchiyama et al. |
| 2014/0018779 A1 | 1/2014 | Worrell et al. |
| 2014/0024905 A1 | 1/2014 | Sarrafzadeh et al. |
| 2014/0031713 A1 | 1/2014 | Gaw et al. |
| 2014/0073952 A1 | 3/2014 | Rodriguez-Llorente et al. |
| 2014/0073957 A1 | 3/2014 | Rodriguez-Llorente et al. |
| 2014/0073964 A1 | 3/2014 | Rodriguez-Llorente et al. |
| 2014/0155759 A1 | 6/2014 | Kaestle et al. |
| 2014/0213858 A1 | 7/2014 | Presura et al. |
| 2014/0213863 A1 | 7/2014 | Loseu et al. |
| 2014/0253709 A1 | 9/2014 | Bresch et al. |
| 2014/0276166 A1 | 9/2014 | Drori et al. |
| 2014/0288436 A1 | 9/2014 | Venkatraman et al. |
| 2014/0309537 A1 | 10/2014 | Niwa et al. |
| 2014/0330132 A1 | 11/2014 | Raskin |
| 2014/0343371 A1 | 11/2014 | Sowers et al. |
| 2015/0038810 A1 | 2/2015 | Melker |
| 2015/0065819 A1 | 3/2015 | Thakur et al. |
| 2015/0088002 A1 | 3/2015 | Podhajsky et al. |
| 2015/0088003 A1 | 3/2015 | Podhajsky et al. |
| 2015/0157219 A1 | 6/2015 | Lee et al. |
| 2015/0164404 A1 | 6/2015 | Euliano et al. |
| 2015/0196256 A1 | 7/2015 | Venkatraman et al. |
| 2015/0223760 A1 | 8/2015 | Greifer |
| 2015/0257663 A1 | 9/2015 | Deliwala |
| 2015/0272488 A1 | 10/2015 | Ueda et al. |
| 2015/0335293 A1 | 11/2015 | Christman et al. |
| 2015/0366469 A1 | 12/2015 | Harris et al. |
| 2016/0015275 A1 | 1/2016 | Samadani et al. |
| 2016/0022157 A1 | 1/2016 | Melker et al. |
| 2016/0022201 A1 | 1/2016 | Arnold et al. |
| 2016/0022220 A1 | 1/2016 | Lee et al. |
| 2016/0029898 A1 | 2/2016 | LeBoeuf et al. |
| 2016/0058300 A1 | 3/2016 | Yoon et al. |
| 2016/0058375 A1 | 3/2016 | Rothkopf |
| 2016/0070245 A1 | 3/2016 | Lee et al. |
| 2016/0089053 A1 | 3/2016 | Lee et al. |
| 2016/0113526 A1 | 4/2016 | Nageshwar et al. |
| 2016/0128586 A1 | 5/2016 | Parton et al. |
| 2016/0128604 A1 | 5/2016 | Eom et al. |
| 2016/0128637 A1 | 5/2016 | LeBoeuf et al. |
| 2016/0183813 A1* | 6/2016 | Naima ................ A61B 5/0537 600/479 |
| 2016/0206220 A9 | 7/2016 | Robinson |
| 2017/0100052 A1* | 4/2017 | Jung ..................... A61B 5/086 |
| 2018/0110465 A1 | 4/2018 | Naima |
| 2018/0317781 A1 | 11/2018 | Naima |
| 2020/0163578 A1* | 5/2020 | Aliverti ............... A61B 5/6848 |

FOREIGN PATENT DOCUMENTS

| | | |
|---|---|---|
| CA | 2539547 A1 | 3/2005 |
| CA | 2578106 A1 | 12/2005 |
| CN | 101730503 A | 6/2010 |
| CN | 103815888 A | 1/2016 |
| EP | 0985429 B1 | 12/2004 |
| EP | 2219513 B1 | 5/2012 |
| EP | 2687154 A1 | 1/2014 |
| EP | 1948017 B1 | 4/2014 |
| EP | 2896359 A1 | 7/2015 |
| EP | 2155058 B1 | 9/2015 |
| EP | 2443993 B1 | 3/2016 |
| EP | 1898784 B1 | 5/2016 |
| GB | 2316171 B | 11/2000 |
| GB | 2393786 A | 4/2004 |
| GB | 2425180 B | 3/2009 |
| GB | 2520487 A | 5/2015 |
| GB | 2523880 A | 9/2015 |
| JP | 2001-198098 A | 7/2001 |
| JP | 2002-159473 A | 6/2002 |
| JP | 2002-282232 A | 10/2002 |
| JP | 2006271949 A | 10/2006 |
| JP | 3856477 B2 | 12/2006 |
| JP | 2008-502382 A | 1/2008 |
| JP | 2013132326 A | 7/2013 |
| JP | 2013-233357 A | 11/2013 |
| JP | 5587774 B2 | 9/2014 |

(56) References Cited

FOREIGN PATENT DOCUMENTS

| | | | |
|---|---|---|---|
| JP | 2015-002779 A | 1/2015 |
| JP | 5687994 B2 | 1/2015 |
| JP | 5802748 B2 | 11/2015 |
| JP | 5893922 B2 | 3/2016 |
| JP | 2019-041812 A | 3/2019 |
| KR | 20110136113 A | 12/2011 |
| SG | 189433 A1 | 8/2013 |
| WO | 2008/067122 A1 | 6/2008 |
| WO | 2009/064979 A2 | 5/2009 |
| WO | 2010/117545 A1 | 10/2010 |
| WO | 2011-134489 A1 | 11/2011 |
| WO | 2013/019494 A2 | 2/2013 |
| WO | 2013/166341 A1 | 11/2013 |
| WO | 2014/125402 A1 | 8/2014 |
| WO | 2014/201183 A1 | 12/2014 |
| WO | 2014/207671 A2 | 12/2014 |
| WO | 2015/036289 A1 | 3/2015 |
| WO | 2015/084376 A1 | 6/2015 |
| WO | 2015/087164 A1 | 6/2015 |
| WO | 2015/102589 A1 | 7/2015 |
| WO | 2015/102591 A1 | 7/2015 |
| WO | 2015/116163 A1 | 8/2015 |
| WO | 2015/116891 A1 | 8/2015 |
| WO | 2015/130413 A1 | 9/2015 |
| WO | 2015/131065 A1 | 9/2015 |
| WO | 2015/150199 A1 | 10/2015 |
| WO | 2015/150434 A1 | 10/2015 |
| WO | 2016/000986 A1 | 1/2016 |
| WO | 2016/037991 A1 | 3/2016 |
| WO | 2016/040253 A | 3/2016 |
| WO | 2016/040264 A | 3/2016 |
| WO | 2016/069082 A | 5/2016 |
| WO | 2016/100145 A | 6/2016 |

OTHER PUBLICATIONS

Adamson et al.; "Continuous autonomic assessment in patients with symptomatic heart failure: prognostic value of heart rate variability measured by an implanted cardiac resynchronization device"; Circulation; 110 (16); pp. 2389-2394; Oct. 19, 2004.

Anand et al; "Design and performance of a multisensor heart failure monitoring algorithm: results from the multisensor monitoring in congestive heart failure (MUSIC) study"; J. Card Fail; 18(4); pp. 289-295; Apr. 2012.

Bouchaala et al.; Portable bioimpedance spectrometer for total frequency range of beta-dispersion; tm-Technisches Messen Im—Technisches; 80(11 ); pp. 373-378; Nov. 1, 2013.

Cowie et al; "Development and validation of an integrated diagnostic algorithm derived from parametersmonitored in implantable devices for identifying patients at risk for heart failure hospitalization in an ambulatory setting"; Eur Heart J.; 34(31 ): pp. 2472-2480; Aug. 2013.

Goetze et al; "Ambulatory respiratory rate trends identify patients at higher risk of worsening heart failure in implantable cardioverter defibrillator and biventricular device recipients: a novel ambulatory parameter to optimize heart failure management": J Interv Card Electrophysiol.; 43(1); pp. 21-29; Jun. 2015.

Joseph et al; Acute Decompensated Heart Failure;11 Tex Heart Inst J.; 36(6); pp. 510-520; (year of pub. sufficiently earlier than effective US filing date and any foreign priority date) 2009.

Maurer et al; Rationale and Design of the Left Atrial Pressure Monitoring to Optimize Heart Failure TherapyStudy (LAPTOP-HFt; J. Card Fail; 21 (6); pp. 479 488; Jun. 2015.

Whellan et al; "Combined Heart Failure Device Diagnostics Identify Patients at Higher Risk of Subsequent Heart Failure Hospitalizations"; J. Am. Coll. Cardio!.; 55(17); pp. 1803 181 O; Apr. 27, 2010.

Yang et al.; Design and preliminary evaluation of a portable device for the measurement of bioimpedance spectroscopy; Physiol. Meas.; 27(12); pp. 1293-1310; Dec. 2006.

* cited by examiner

SYSTEMS AND METHODS FOR CALIBRATING DRY ELECTRODE BIOELECTRICAL IMPEDANCE SENSING

CROSS REFERENCE TO RELATED APPLICATIONS

This application is a division of U.S. patent application Ser. No. 16/714,594, filed Dec. 13, 2019, which is based upon and claims the benefit of priority to U.S. Provisional Patent Application No. 62/779,657, filed on Dec. 14, 2018, which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The methods and apparatuses described herein may be used to measure bioelectric signals, including bioelectric impedance signals. In particular, described herein are methods and apparatuses for accurately and quickly calibrating dry electrodes and determining bioelectrical impedance.

BACKGROUND

Bioelectric measurements such as electrocardiogram (ECG, EKG), electroencephalogram (EEG), Electromyography (EMG), galvanic skin response, bioimpedance and others are dependent on the electrical parameters of the skin-electrode interface for each electrode. Any mismatch in impedance between the electrode and the skin for differential measurements may cause phase and amplitude shifts in the measured signals that degrades the measurement and diagnostic fidelity. The skin-electrode impedance is dominated by the highest impedance element, the skin, which has highly variable impedance and cannot be directly measured with any accuracy. The skin impedance varies with time, the subject and the environment. In addition, slight changes in the skin contact, and/or skin position may result in large variations in measurements.

The industry standard for bioelectric measurements is hydrogel electrodes. When coupled with skin preparation, hydrogel electrodes provide good signal quality. However, hydrogel electrodes are not suitable for ambulatory monitoring or monitoring over extended periods of time as they are uncomfortable, they dry out over time and they require frequent replacement. It is also very difficult to maintain subject compliance with the skin preparations that are required to optimize the performance of hydrogel electrodes for ambulatory or long term monitoring.

SUMMARY OF THE DISCLOSURE

The apparatuses and methods described below provide for accurate and consistent dry electrode sensing for ambulatory and or long-term bioelectric measurements. In particular, these apparatuses (e.g., devices, systems, etc.) and methods are well-suited and may be used for determining accurate and consistent detection of bioelectric impedance signals. Optimizing dry-electrode sensing requires periodic or continuous calibration of the electrode-skin interface as the interface characteristics change with time and user movement.

Described herein are methods and apparatuses, including systems, that calibrate the bioelectrical measurements (e.g., bioelectrical impedance) by measuring electrical properties of biological tissue using one or more pairs of sensing electrodes, and determining a calibrated impedance measurement from an applied forward current (in which current is applied between a pair of stimulation electrodes in a forward direction), as well as an applied shorted current (in which the same current is applied simultaneously to both stimulation electrodes). The voltages at the sensing electrodes during both the forward operation (e.g., forward current) and the shorted operation (e.g., shorted current), as well as the current or voltage at a current sense resistor during the forward operation may provide a calibrated tissue impedance measurement for the tissue. Sensing bioimpedance using this self-calibrated measurement, in which the 'shorted' current is used to calibrate the forward (and/or in some variations, reverse) current may provide highly accurate and reproducible results. The shorted current may be applied before or after the forward (and/or reverse) current, and may be applied immediately or shortly (e.g., within a few milliseconds, second or minutes) or the forward (and/or reverse) current. The same current may be applied in the shorted configuration (e.g., same amplitude, frequency, duration, etc.) as in the forward and/or reverse current configuration(s). In some variations one or more properties (e.g., amplitude, frequency, duration, etc.) of the shorted current may be different from the forward and/or reverse current.

In some variations, the method or apparatus (e.g., system) may also or alternatively use the reverse operation, in which current is applied between the stimulation electrodes in a direction that is opposite to the forward operation; the reverse operation may be used with the shorted operation and the voltages at the sensing electrodes during both the reverse operation and the shorted operation, as well as the current or voltage at a current sense resistor during the reverse operation may provide a calibrated tissue impedance measurement for the tissue.

In some variations the forward operation, reverse operation and the shorted operation may be used, and the calibrated tissue impedance measurement determined from the forward operation and shorted operation may be combined (e.g., averaged, weighted, modified, etc.) with the calibrated tissue impedance measurement determined from the reverse operation and shorted operation to provide an improved fit.

The apparatuses and methods described herein for calibrating the bioelectric signals measured with dry electrodes described herein, by combining forward and shorted and/or reversed and shorted sensing may correct for changes in the skin-electrode interface of dry electrodes and may calibrate the measured bioelectric signals to provide diagnostic quality signals.

For example, a bioelectric impedance measurement apparatus may include: at least one pair of stimulation electrodes, comprising a source electrode and a sink electrode; at least one pair of sense electrodes, comprising a first sense electrode and a second sense electrode; a signal generator operably connected to the at least one pair of stimulation electrodes; a controller configured to switch the apparatus between a normal mode, in which the signal generator applies a current between the source electrode and the sink electrode, and a shorted mode, in which the signal generator applies the same current to both the source electrode and the sink electrode; and a processor configured to output a calibrated bioelectric impedance measurement based at least in part on a signal at the sense electrodes in both the normal mode and the shorted mode. The apparatus may be configured so that the current is applied shorted mode and in the normal (e.g. forward) mode within a predefined time of each other (e.g., within a 1 ms, within 10 ms, within 100 ms, within 1 sec, within 10 sec, within 30 sec, within 1 min, etc.).

The processor may be further configured to determine the calibrated bioelectric impedance measurement based at least in part on measurements equivalent to: a voltage difference between the first and second sense electrodes in both the normal mode and the shorted mode; a ratio of voltages at the first sense electrode in the normal mode and the shorted mode; and a current across a current sense resistor in the normal mode.

In any of these apparatuses, the processor may be integrated with the controller. The controller may be configured to automatically switch between the normal mode and the shorted mode (e.g., within a predefined time period, e.g., within a ms, within 10 ms, within 100 ms, within 1 sec, etc.). In some variations, the controller is configured to drive a multiplexer configured to switch between the normal mode and the shorted mode.

The apparatus (e.g., the control of the apparatus) may be configured to switch between the normal mode, the shorted mode and/or a reverse mode, in which the signal generator applies a current between the sink electrode and the source electrode in a direction that is reversed in relation to the normal mode. Thus, in some variations, the processor may be configured to determine a first bioelectric impedance measurement based at least in part on the signal at the sense electrodes in both the normal mode and the shorted mode and a second bioelectric impedance measurement based at least in part on the signal at the sense electrodes in both the reverse mode and the shorted mode, wherein the calibrated bioelectric impedance measurement combines the first bioelectric impedance measurement and the second bioelectric impedance measurement. In some variations, the calibrated bioelectric impedance measurement is an average of the first and second bioelectric impedance measurements.

Any of the apparatuses described herein may be configured to be worn. For example, the apparatus may be configured to be worn on an arm, wrist, hand, neck, torso, waist, leg, ankle, head, etc., or more than one of these. In some variations the apparatus is configured as part of a garment (e.g., shirt, pants, etc.) or jewelry (e.g., bracelet, anklet, earring, necklace, glasses, etc.). For example, the apparatuses described herein may be configured as a wrist-worn device.

Any of these apparatuses may include a current sense resistor in communication with the at least one pair of stimulation electrodes.

In general, as mentioned above, the methods and apparatuses described herein may be used with dry electrodes. For example, the stimulation electrodes and/or sense electrodes may all be dry electrodes. In some variations the dry electrodes do not include a gel (e.g., conductive gel, hydrogel, etc.).

Also described herein are methods of determining a bioelectrical impedance, which may be referred to as a "calibrated bioelectrical impedance". For example, described herein are methods including: applying, in a forward mode, a first current between a source electrode and a sink electrode and storing voltages from a first sense electrode and a second sense electrode; applying, in a shorted mode, a second current simultaneously to both the source electrode and the sink electrode and storing voltages from the first sense electrode and the second sense electrode; and outputting a calibrated bioelectric impedance measurement, wherein the bioelectric impedance measurement is based at least in part on the voltages of the sense electrodes in both the forward mode and the shorted mode. The first and second current may have the same amplitude, frequency, and/or duration. The first and second currents may be applied within a predetermined time of each other (e.g., within 1 ms, 10 ms, 30 ms, 50 ms, 100 ms, 1 s, 2 s, etc.). The first and second currents may be provided substantially immediately after one another. The method may include cycling between modes (e.g., between the forward mode and shorted mode or between forward, e.g., normal, mode, shorted mode and reverse modes).

Estimating the calibrated bioelectric impedance measurement may comprise determining the calibrated bioelectric impedance measurement based at least in part on measurements equivalent to: a voltage difference between the first and second sense electrodes in both the normal mode and the shorted mode; a ratio of voltages at the first sense electrode in the normal mode and the shorted mode; and a current across a current sense resistor in the normal mode.

In some variations estimating the calibrated bioelectric impedance measurement ($Z_2$) comprises subtracting from a differential voltage of the first and second sensing electrodes in the normal mode ($\beta_N$), a differential voltage of the first and second sense electrodes in the shorted mode ($\beta_B$) multiplied by the ratio of voltages at the input of one of the sense electrodes in the normal mode and the shorted mode ($\gamma_N/\gamma_B$) and dividing by the current across the current sense resistor in the normal mode ($\alpha_N/Z_6$), wherein: $Z_2 = (\beta_N - \beta_B * (\gamma_N/\gamma_B))/(\alpha_N/Z_6)$ Any of these methods may include automatically switching between the forward mode and the shorted mode.

In some variations, the method includes applying, in a reverse mode, a third current between the sink electrode and the source electrode so that current between the sink electrode and the source electrode is reversed in relation to the forward mode, and storing voltages from the first sense electrode and the second sense electrode. For example, the method may include determining a first bioelectric impedance measurement based at least in part on the signal at the sense electrodes in both the forward mode and the shorted mode and determining a second bioelectric impedance measurement based at least in part on the signal at the sense electrodes in both the reverse mode and the shorted mode, wherein the calibrated bioelectric impedance measurement combines the first bioelectric impedance measurement and the second bioelectric impedance measurement. The calibrated bioelectric impedance measurement may be a function (e.g., an average, or other function) of the first and second bioelectric impedance measurements.

The methods described herein may be performed by any of the apparatuses described. In some variations the method is performed on a self-contained device (e.g., watch, bracelet, garment, etc.) including a processor. In some variations the method may be distributed between a wearable apparatus and a remote processor or processors; the apparatus may be in wireless communication with the remote processor (e.g., smartphone, tablet, laptop, server, etc.). In some variations the apparatus performing all or some of the method is configured as a wrist-worn device.

Any of the methods described herein may be configured to measure a current through a current sense resistor. In general, the electrodes described herein may be positioned to be in contact with the skin or tissue of the biological body.

The impedance of the biological body may be indicative of the composition of the biological body. For example, the impedance of the biological body may be used to determine an amount of water or liquids in the biological body, fat-free body mass, or body fat. As mentioned, the apparatus may be part of a watch, an activity tracker, an armband, a chest band or a patch, etc. The apparatus may be used to provide biometrics, for example, to a user, physician, database, etc. The biometrics may include bioelectric impedance, or any parameter based on bioimpedance, such as body composition or fluid content, among others.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

In general, described herein are bioelectric measurement methods and apparatuses that may be used to accurately determine a bioelectric property such as bioelectric impedance (bioimpedance) when using dry electrodes. These methods and apparatuses may be configured to apply both a forward configuration (and/or reverse configuration) current between a source and sink electrodes (stimulation electrodes) and a shorted current concurrently to both the source and sink electrodes, and to detect and store the voltage at each of a pair of sense electrodes in the forward (and/or reverse) configuration and the shorted configuration, as well as the current (and/or in some variations, voltage) of a current sensing resistor in the forward (and/or reverse configuration). The method or apparatus may use electrical measurements of the forward (and/or reverse) configuration as well as the shorted configuration in order to calibrate and provide an accurate bioelectrical impedance measurement.

Thus any of the apparatuses described herein may include at least one pair of source and sink electrodes, which may form a pair of stimulation electrodes, and at least one pair of sense electrodes, and a current sense resistor. The source, sink and sense electrodes may all be dry electrodes. The apparatus may also include a signal generator for generating the current configured to be applied to either or both the source and sink electrodes of the stimulation electrodes. The signal generator may be configured to apply a current having a frequency or range of frequencies. For example, the current may be an alternating current (AC), e.g. from a low frequency (e.g. 1 KHz) to a high frequency (e.g. 1 MHz or more) and the measured electrical values (e.g., voltage or currents during forward, reverse or shorted configurations) can be sampled for at various frequencies. By varying the frequency of the AC current, the relationship between impedance and frequency can be measured.

Any of the apparatuses described herein may also or alternatively include a signal processor configured to process any of the applied or sensed voltages and/or currents. The signal processor may be configured to sample and/or store signals from any of the electrodes and/or the current sense resistor. In some variations the signal processor may be configured to smooth, average, convert, or otherwise process the signals. The signal processor may receive input from and/or may be integrated with, a controller. The signal processor may receive input from and/or may be integrated with the signal generator. Similarly, the signal generator may receive input from and/or be integrated with the controller.

Any of the apparatuses described herein may be configured to switch between the shorted configuration, the forward configuration and/or the reverse configuration. Thus, the apparatus may include any combination of hardware, firmware and/or software to switch between these modes, and to receive, store and determine a calibrated tissue impedance from the sense electrode voltages and the current through the current sense resistor (or equivalent) during these different modes, as will be described in greater detail below. In some variations, a controller may be configured to switch the apparatus between these modes, receive and process the sensed voltages and/or current(s) and output the calibrated tissue impedance.

The apparatuses described herein may generally be configured to be worn on a subject's skin. For example, the apparatus may be configured to be worn on the subject's arm, wrist, hand, shoulder, chest, neck, waist, torso, abdomen, head, leg ankle, foot, etc. In particular, the methods and apparatuses described herein may be configured to be used with a wrist-worn device including a pair of sense electrodes and a pair of stimulation electrodes (e.g., source and sink electrodes) mounted on a rigid or flexible frame (e.g., strap, wristband, etc.) that is configured to secure these dry electrodes against the subject's skin.

Figure 1:
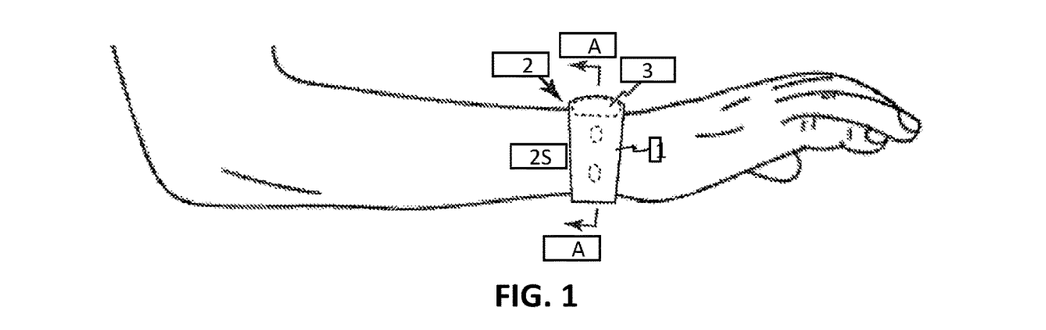
FIG. 1 is a side view of one example of an apparatus (e.g., a bioelectric measurement system) worn on a subject's wrist.
Figure 2:
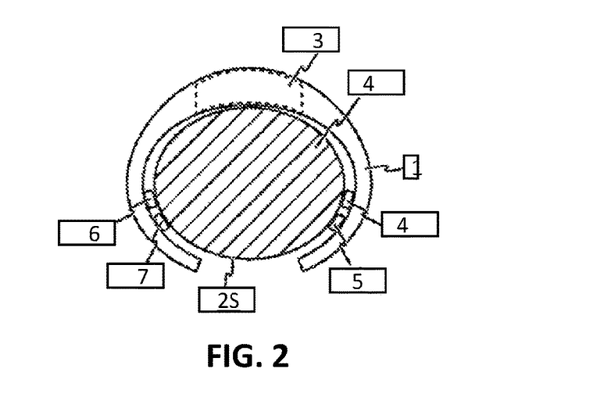
FIG. 2 is cross section of the exemplary bioelectric measurement system of FIG. 1 taken along line A-A.

FIGS. 1 and 2 illustrate one example of a bioelectric measurement system 1 configured to be worn on a subject's wrist 2. The subject's wrist 2 is covered with skin 2S. The bioelectric measurement system 1 includes internal electronics 3 which are connected to electrodes 4, 5, 6 and 7 which contact the skin 2S. First and third electrodes 4 and 6 are stimulation electrodes (e.g., source 4 and sink 6 in the forward configuration and sink 4 and source 6 in the reverse configuration) and second and fourth electrodes 5 and 7 are sense electrodes. The electrodes may all be dry contact electrodes and may require no skin preparation, gel or other material to optimize the skin-electrode impedance. In some variations the sense electrodes are between the stimulation electrodes. In some variations, multiple source and/or sense electrodes are included; the methods and apparatuses described herein may be used with multiple pairs (or pair combinations) of source and sense electrodes.

Characteristics of the interface between the subject's skin 2S and electrodes 4, 5, 6 and 7, such as impedance and capacitance, may typically change over time and as the subject moves. The changes in the skin-electrode interface characteristics may be accurately characterized and then compensated for during bioelectric data collection using the methods and apparatuses described herein.

Figure 3:
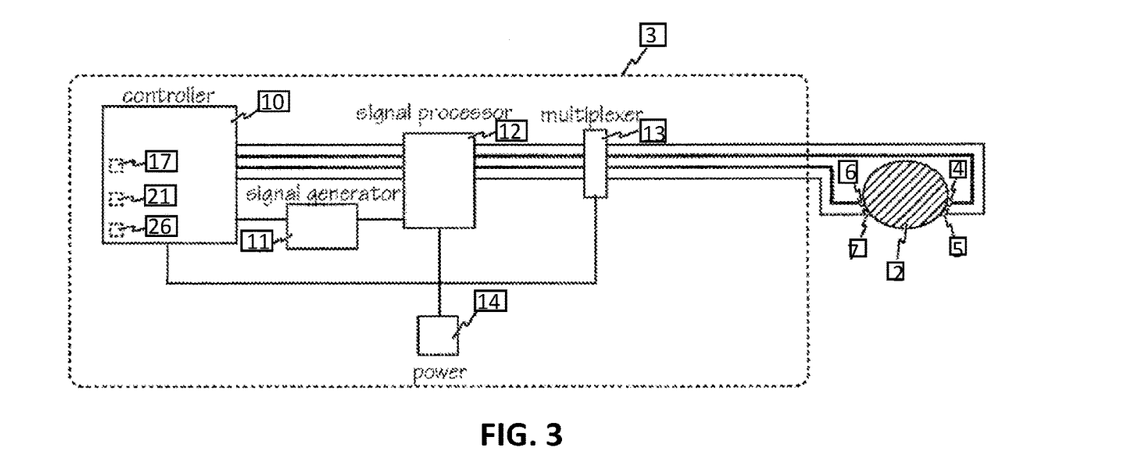
FIG. 3 is a block diagram of one example of a bioelectric measurement system of such as the one shown in FIG. 2.

FIG. 3 shows one example of an apparatus for determining a calibrated bioelectrical impedance of a subject's tissue (e.g., skin tissue). This schematic may apply to an apparatus such as the wrist-worn apparatus shown in FIGS. 1 and 2. As shown in FIG. 3, the internal electronics may include a controller 10, signal generator 11, signal processing electronics 12, optional multiplexer 13 and power source 14. As mentioned above, in some variations any of these components may be combined/integrated together. Characterization of the skin-electrode interface may be accomplished by routing a signal (e.g., a test signal) from the signal generator 11 through the optional multiplexer 13 or other control and/or switching circuitry and through the stimulation electrodes 4 and 6 in a forward configuration or a shorted configuration (and in some variations, in a reverse configuration) as described and illustrated below in FIGS. 4-6.

Figure 4:
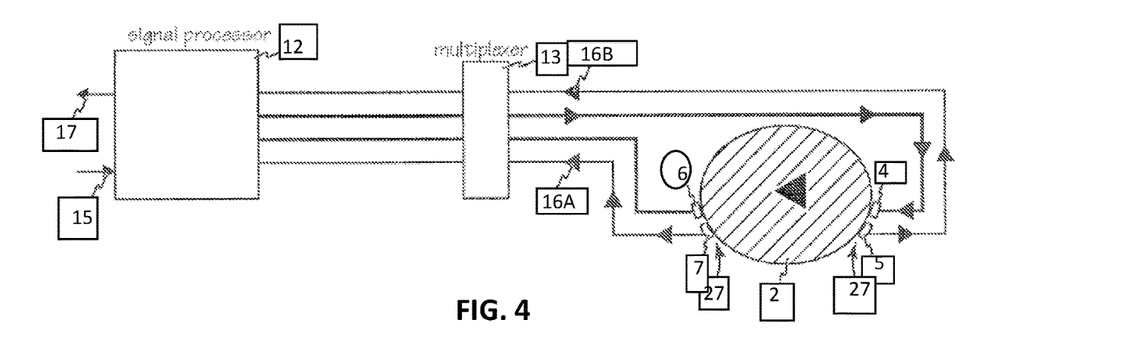
FIG. 4 is a portion of the block diagram of FIG. 3 schematically illustrating a forward signal path through the sense electrodes.

For example, FIG. 4 illustrates one example of the operation of an exemplary apparatus such as the one shown schematically in FIG. 3 in a forward configuration. In this example, in the forward configuration the controller may be configured to operate the apparatus so that the signal 15 from the signal generator 11 is passed and/or processed by one or more elements of the signal processor 12 and routed (e.g., by multiplexer 13) in a first or forward direction between the source 4 and sink 6 electrodes of the apparatus. As the current (the signal) is applied between the source and sink electrodes, the apparatus may detect signals from the sense electrodes 5, 7. In this example, data signals 16A and 16B may be processed and interpreted by signal processor 12 and controller 10. These data signals may correspond to voltage (s) at the sense electrodes. Concurrently, a signal (e.g., voltage and/or current) from the current sense resistor (not shown in FIG. 4) may be recorded during the application of the forward signal and the resulting forward or first characteristic data 17 may be stored by the controller 10 as shown in FIG. 3.

Following operation of the apparatus in the forward configuration for one or more set of samples (e.g., recording at one or more frequencies, etc.) the apparatus may be automatically (e.g., by action of the controller) switched to operate in the shorted configuration. Alternatively or additionally, the apparatus may be configured to switch to operate in the reverse configuration, in which the source and sink electrodes may be reversed (e.g., the source may operate as the sink and the sink as the source). This is illustrated in FIG. 5.

Figure 5:
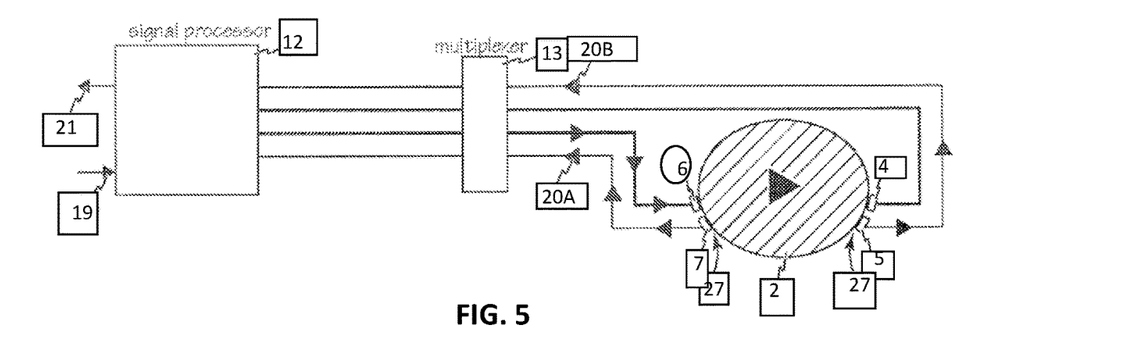
FIG. 5 is a portion of the block diagram of FIG. 3 schematically illustrating a reverse signal path through the sense electrodes.

FIG. 5 illustrates one example of the operation of an exemplary apparatus such as the one shown schematically in FIG. 3 in a reverse configuration. In FIG. 5, a signal 19 from the signal generator 11 (which may be the same or different from the signal(s) applied in the forward configuration) may be processed by one or more elements of the signal processor 12 and routed (e.g., by multiplexer 13) in a second or reverse direction, between the sink 6 and source 4 electrodes. The sense electrodes 5, 7 may be used to record data signals 20A and 20B (e.g., voltages) arising from the applied reverse current, and these sense data signals may be processed and interpreted by signal processor 12 and controller 10, along with the sensed current and/or voltage from the current sense resistor (not shown), and the resulting reverse or second characteristic data 21 may be stored by the controller 10 as shown in FIG. 3.

As mentioned above, immediately following one or more operations of the apparatus in the forward and/or reverse configuration or modes, the apparatus may be automatically (e.g., by action of the controller) switched to operate in the shorted configuration, in which current is sent to both the source and sink electrodes simultaneously. In the shorted configuration (or shorted mode) the same current may be applied to both the source and sink electrodes. The applied current may be the same or approximately the same as applied during the forward and/or reverse configuration. In some variations the current may be different (e.g., the current applied to both electrodes when operating in the shorted configuration may be less than during operation in the forward and/or reverse configuration.

Figure 6:
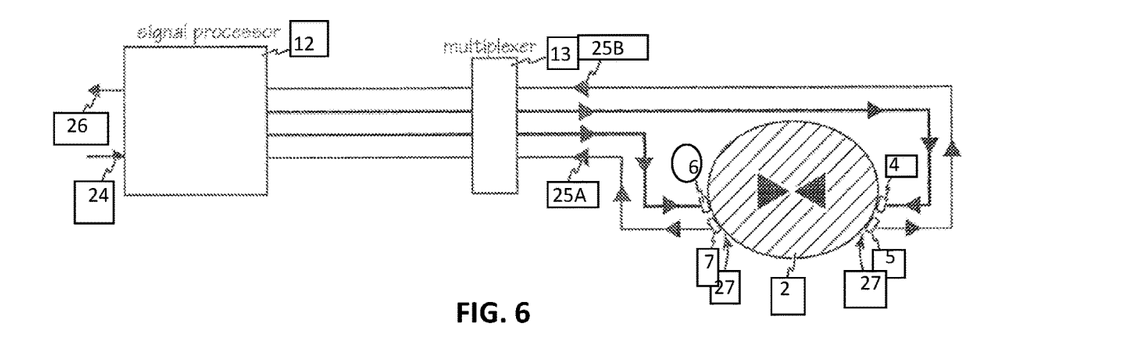
FIG. 6 is a portion of the block diagram of FIG. 3 schematically illustrating a shorted signal path through the sense electrodes.

FIG. 6 illustrates the operation of the exemplary apparatus described above in the shorted configuration/mode. In FIG. 6, parallel signals 24 (e.g., current) from the signal generator 11 may be processed by one or more elements of the signal processor 12 and routed (e.g., by multiplexer 13) in a third, parallel or shorted direction so that the same signal (current) is applied to both the source 4 and sink 6, as shown. The signal sensed by the sense electrodes arising from the applied signal may be received as data signals 25A and 25B and processed and/or interpreted by signal processor 12 and controller 10. The received signals (e.g., voltage at the sense electrodes) during the shorted operation may correspond to shorted or third characteristic data 26 and may be stored by the controller 10 as shown in FIG. 3.

In some variations, the controller 10 use the forward data 17 and shorted data 26 (and/or in some embodiments, the reverse data 21 and shorted data 26) to characterize the interface 27 between electrodes 4, 5, 6 and 7 and skin 2A and to determine an accurate estimation of the bioelectric signals (e.g., bioelectric impedance) of the tissue.

As will be described in further detail below, the use of the shorted configuration may allow the bioelectric impedance to be calibrated even when using dry electrodes. Note that although the examples described herein work particularly well for dry electrodes, these methods and apparatuses may also be applied to wet (e.g., hydrogel) electrodes used for bioelectric impedance.

The impedance mismatch between the subject's tissue 2S and the electrodes (e.g., between S2 and 7 and between S2 and 5) can be determined during calibration using the methods and apparatuses described herein, and may be used to adjust the interpretation of bioelectric signals from the electrodes 4, 5, 6 and 7. The bioelectric measurement system 1 measures a set of calibration measurements. For example, the system calibration measurements may include the differential voltage between the sense electrodes 5 and 7, the total current through the electrodes (e.g., the current through the current sense resistor), and the voltage at the input of one of the sense electrodes during the forward (or reverse) and shorted configurations. Any suitable set of measurements may be used to calibrate the electrode/skin interface impedance.

For example, as described above, a first set of measurements may be made with the current applied in either the forward or the reverse direction to provide forward data 17, or reverse data 21. Shorted data 26 may be collected as discussed above (e.g., immediately after, before or intermittently with collecting the data from the forward and/or reverse configuration), and the first set of data, e.g., forward data 17, and the shorted data 26 may be combined to calculate a first impedance of subject's tissue 2 that is calibrated by the use of the shorted data.

In some variations, the measurement and calculation process may be repeated using the previously unused current direction (e.g., reverse data 21) and the corresponding shorted data 26. The reverse data 21 and the shorted data 26 may be combined to calculate a second impedance of subject's tissue 2. The first impedance data may then be combined with the second impedance data, e.g., by averaging the two together, by weighting the forward with the reverse, etc., which may improve the accuracy of the resulting bioelectric impedance measurements.

Specifically, the bioelectric impedance may be calibrated by the differential voltage at the sense electrodes and a ratio of the voltage at the input to one of the sense electrodes during both the forward and shorted configurations.

Figure 7:
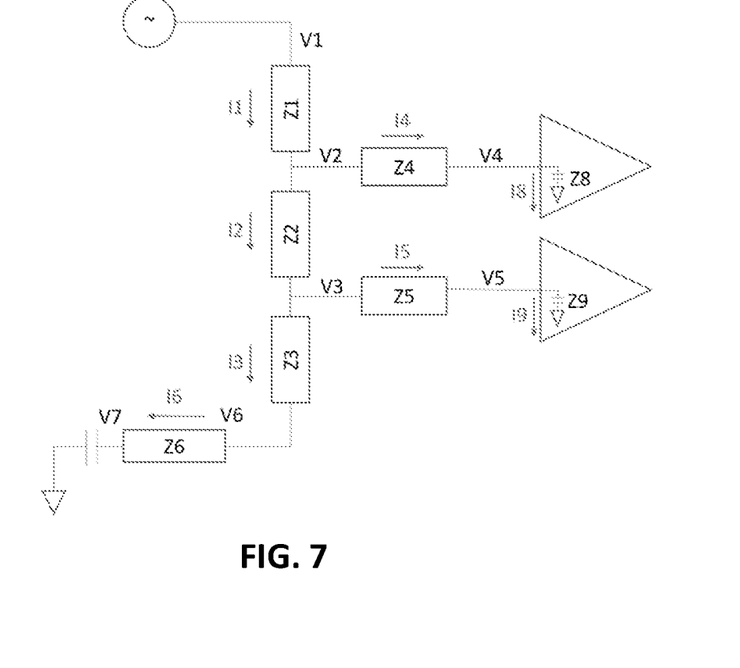
FIG. 7 is an example of one variation of a circuit diagram corresponding to a bioelectric measurement apparatus illustrating a forward signal path as illustrated in FIG. 4 (and, similarly, the reverse signal path of FIG. 5).
Figure 8:
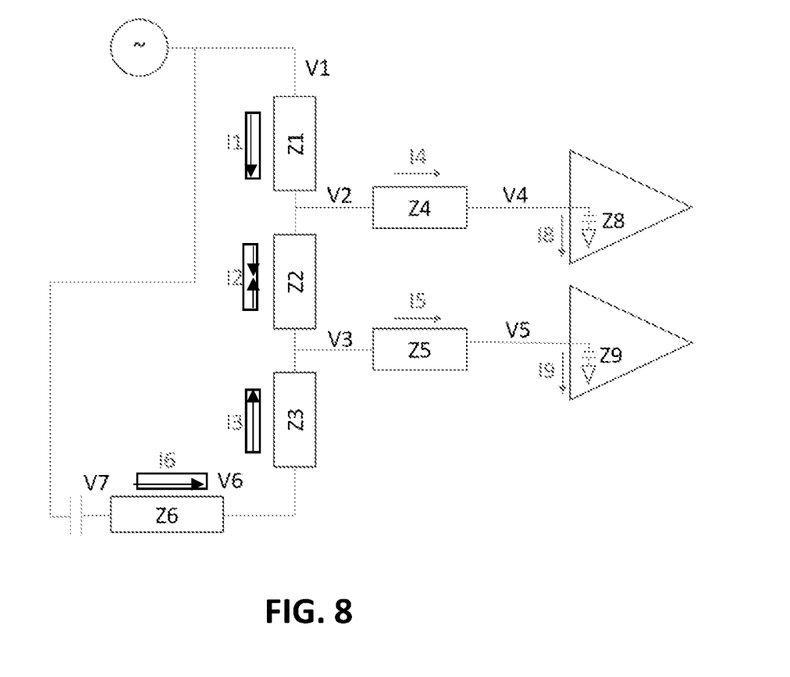
FIG. 8 is an example of one variation of a circuit diagram corresponding to a bioelectric measurement apparatus illustrating a shorted signal path as illustrated in FIG. 6.

For example, FIGS. 7 and 8 show schematic diagrams of the operation of an apparatus such as that shown in FIGS. 3-6, above during a normal, forward, configuration and during a shorted configuration, respectively. In FIGS. 7-8, the current source/sink electrodes 4 and 6 have impedance Z1 and Z3 respectively. The voltage sense electrodes 5 and 7 have impedance Z4 and Z5 respectively. The subject's tissue 2 has impedance Z2. Z6 is the current sense resistor. Z8 and Z9 refer to the input impedance to the buffer amplifiers 8 and 9 respectively. As mentioned above, FIG. 7 illustrates a system in normal operation (e.g., forward configuration or mode) and FIG. 8 illustrates the system operating in a shorted configuration or mode, with the current simultaneously applied to both the source electrode 4 sink electrode 6.

In all of the apparatuses described herein, the bioelectric measurement apparatus (e.g., system) has a current source and sink electrode, and at least two sense electrodes. These apparatuses all also have the capability of switching between the forward (or "normal") configuration and the shorted configuration, and in some variations also the reverse configuration. Thus, these apparatuses may be configured to direct current in a forward direction (and/or reverse direction) as well as directing current into both source and sink electrodes simultaneously, enabling the measurement of leakage currents i8 and i9, shown in FIGS. 7 and 8, through the sense electrodes (e.g., in FIGS. 4-6, sense electrodes 5 and 7).

Thus, a bioelectric measurement system 1 may be configured to measure the differential voltage multiplied by the gain of the amplifier at the sense electrodes: $(G(V_4-V_5))=\beta$. In the normal (forward) configuration, the differential voltage at the sense electrode multiplied by the gain may be indicated by the subscript "N". In the shorted configuration, the differential voltage at the sense electrode multiplied by the gain may be indicated by the subscript "B". Thus:

$$\beta_N=G(V_{4,N}-V_{5,N})$$

$$\beta_B=G(V_{4,B}-V_{5,B})$$

The differential voltage across the current sense resistor is $(G(V_6-V_7))=\alpha$. So, for the forward configurations this may be:

$$\alpha_N=G(V6-V7)=I_{6,N}Z_6 G$$

The various gains indicated above may be set to be the same gain (e.g., the gains for the amplifiers used) or they may be different gains; for convenience, these gains are shown herein as being the same gain, however it should be understood that they may be different.

The voltage at the input of one of the sense electrodes, e.g., $V_4$ is $\gamma$. For the forward and shorted configurations, respectively:

$$\gamma_N=V_{4,N}$$

$$\gamma_B=V_{4,B}$$

The following set of equations describes the current flowing in the forward direction:

$$V_4-V_5=(V_2-Z_4I_4)-(V_3-Z_5I_5)$$

$$V_4-V_5=(V_2-V_3)+(Z_5I_5-Z_4I_4)$$

Where $V_2-V_3$ represents the measurement we want to make and $(Z_5I_5-Z_4I_4)$ represents the error term. Using the following equalities:

$$V_2-V_3=Z_2I_2$$

$$I_2=I_6+I_9$$

it is possible to derive the relationship:

$$V_4-V_5=Z_2(I_6+I_9)+Z_5I_5-Z_4I_4 \quad [1]$$

Noting that $I_5=I_9$ and $I_4=I_8$, $$V_4-V_5=Z_2(I_6+I_9)+Z_5I_9-Z_4I_8 \quad [2]$$

As mentioned above, the normal (e.g., forward/reverse) current operation may be indicated by the subscript of N in the measurement terms. Under this condition, $I_6 >> I_9$, and the relationship simplifies to:

$$V_{4,N}-V_{5,N}=Z_2I_{6,N}+Z_5I_{9,N}-Z_4I_{8,N} \quad [3]$$

For the shorted mode where current is sent to both source and sink electrodes simultaneously (and the subscript of B is included), $I_6+I_9=I_2$ and approximately equal to $I_8$, which is also approximately equal to $I_9$. However, $Z_2 << Z_4$ and $Z_2 << Z_5$, so $Z_2I_2$ can be set to zero. This assumption simplifies the relationship to:

$$V_{4,B}-V_{5,B}=Z_5I_{9,B}-Z_4I_{8,B} \quad [4]$$

Substituting in:

$$I_{9,B} = \frac{V_{5,B}}{Z_9} \text{ and } I_{8,B} = \frac{V_{4,B}}{Z_8}$$

results in:

$$V_{4,B} - V_{5,B} = Z_5\left(\frac{V_{5,B}}{Z_9}\right) - Z_4\left(\frac{V_{4,B}}{Z_8}\right) \quad [5]$$

The ratio of voltages (e.g., $V_4/V_5$) is fairly consistent, independent of the mode of operation. This was validated empirically. In some variations, an additional measurement at $V_5$ may be used to obviate the need for this approximation. Using the relationship:

$$\frac{V_{4,N}}{V_{5,N}} \approx \frac{V_{4,B}}{V_{5,B}} \text{ and rearranging to}$$

$$\frac{V_{4,N}}{V_{4,B}} \approx \frac{V_{5,N}}{V_{5,B}}$$

and multiplying both sides of equation [5] above, results in:

$$(V_{4,B} - V_{5,B})\left(\frac{V_{4,N}}{V_{4,B}}\right) = Z_5 \left(\frac{V_{5,B}}{Z_9}\right)\left(\frac{V_{5,N}}{V_{5,B}}\right) - Z_4 \left(\frac{V_{4,B}}{Z_8}\right)\left(\frac{V_{4,N}}{V_{4,B}}\right) \quad [6]$$

This can be simplified to:

$$(V_{4,B} - V_{5,B})\left(\frac{V_{4,N}}{V_{4,B}}\right) = Z_5 \left(\frac{V_{5,N}}{Z_9}\right) - Z_4 \left(\frac{V_{4,N}}{Z_8}\right) \quad [7]$$

Noting that $$\frac{V_{5,N}}{Z_9} = I_{9,N} \text{ and } \frac{V_{4,N}}{Z_8} = I_{8,N}$$

results in:

$$(V_{4,B} - V_{5,B})\left(\frac{V_{4,N}}{V_{4,B}}\right) = Z_5 I_{9,N} - Z_4 I_{8,N} \quad [8]$$

Subtracting equation [8] from [3] produces:

$$(V_{4,N} - V_{5,N}) - (V_{4,B} - V_{5,B})\left(\frac{V_{4,N}}{V_{4,B}}\right) = \quad [9]$$
$$Z_2 I_{6,N} + Z_5 I_{9,N} - Z_4 I_{8,N} - Z_5 I_{9,N} + Z_4 I_{8,N}$$

Canceling results in:

$$(V_{4,N} - V_{5,N}) - (V_{4,B} - V_{5,B})\left(\frac{V_{4,N}}{V_{4B}}\right) = Z_2 I_{6,N} \quad [10]$$

Finally solving for the tissue impedance ($Z_2$), results in:

$$Z_2 = \frac{(V_{4N} - V_{5,N}) - (V_{4,B} - V_{5,B})\left(\frac{V_{4,N}}{V_{4,B}}\right)}{I_{6,N}} \quad [11]$$

Thus, measuring all the terms in the above equation will provide a calibrated tissue impedance of tissue.

The equalities described above may be used in equation 11 to result in:

$$Z_2 = (\beta_N - \beta_B * (\gamma_N/\gamma_B))/(\alpha_N/Z_6) \quad [12]$$

The preceding analysis assumes that under normal operations, $I_6 \gg I_9$ and thus, the $Z_2 I_9$ term in equation 2 may be set to zero. In the situation where the current is applied to both current paths (e.g., the shorted configuration), $I_6 + I_9 = I_2$ and is approximately the same as $I_8$ and $I_9$, and $Z_2 \ll Z_4$, and $Z_2 \ll Z_5$, allowing $Z_2(I_6 + I_9)$ in equation 2 to be set to zero. Finally, the ratio of the voltages $V_2$ to $V_5$ may be the same in the normal and shorted (blocked) modes, thus the ratio of $V_{4,N}/V_{4,B}$ is approximately equal to $V_{5,N}/V_{5,B}$.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A wearable device for ambulatory measurements of a calibrated bioelectrical impedance of a subject's tissue, comprising:
    a frame including a surface that at least partly contacts a skin of the subject when the wearable device is worn by the subject;
    a plurality of stimulation electrodes arranged along the surface and including a source electrode and a sink electrode;
    a plurality of sense electrodes arranged along the surface and including first and second sense electrodes;
    a signal generator electrically connected to the stimulation electrodes;
    a current sense resistor electrically connected to the stimulation electrodes; and
    a controller configured to:
        set an operation mode of the wearable device to a normal mode when the wearable device is worn by the subject,
        while the wearable device is operating in the normal mode, control the signal generator to apply a first current between the source and sink electrodes, sense voltages at the first and second sense electrodes, and then automatically switch the operation mode from the normal mode to a shorted mode,
        while the wearable device is operating in the shorted mode, control the signal generator to apply a second current simultaneously to both the source and sink electrodes, and sense voltages at the first and second sense electrodes,
        determine the calibrated bioelectric impedance based at least in part on: a voltage difference between the first and second sense electrodes in both the normal and shorted modes, a ratio of voltages at one of the first and second sense electrodes in the normal and shorted modes, and a third current across the current sense resistor in the normal mode, and output the calibrated bioelectric impedance.

2. The wearable device according to claim 1, wherein the calibrated bioelectric impedance is determined by the following formula:

$$Z_2=(\beta_N-\beta_B*(\gamma_N/\gamma_B))/(\alpha_N/Z_6)$$

where $Z_2$ is the calibrated bioelectric impedance, $\beta_N$ is the voltage difference between the first and second sense electrodes in the normal mode, $\beta_B$ is the voltage difference between the first and second sense electrodes in the shorted mode, $\gamma_N/\gamma_B$ is the ratio of voltages at said one of the first and second sense electrodes in the normal mode and the shorted mode, and $\alpha_N/Z_6$ is the third current across the current sense resistor in the normal mode.

3. The wearable device according to claim 1, wherein the controller is configured to:

set the operation mode to a reverse mode, and while the wearable device is operating in the reverse mode, control the signal generator to apply a fourth current between the sink and source electrodes in a direction opposite to the first current, and sense voltages at the first and second sense electrodes.

4. The wearable device according to claim 3, wherein the controller is configured to determine a first bioelectric impedance based at least in part on the voltages at the first and second sense electrodes in both the normal and shorted modes, and determine a second bioelectric impedance based at least in part on the voltages at the first and second sense electrodes in both the reverse and shorted modes, and the calibrated bioelectric impedance is determined using the first and second bioelectric impedances.

5. The wearable device according to claim 4, wherein the calibrated bioelectric impedance is an average of the first and second bioelectric impedances.

6. The wearable device according to claim 1, wherein each of the stimulation and sense electrodes is a dry electrode.

7. A measurement apparatus for measuring a calibrated bioelectrical impedance of a subject's tissue, comprising:

a frame including a surface that at least partly contacts a skin of the subject;

a plurality of stimulation electrodes arranged along the surface and including a source electrode and a sink electrode;

a plurality of sense electrodes arranged along the surface and including first and second sense electrodes;

a signal generator electrically connected to the stimulation electrodes;

a current sense resistor electrically connected to the stimulation electrodes; and a controller configured to:

set an operation mode of the measurement apparatus to a normal mode when the surface contacts the skin, while the measurement apparatus is operating in the normal mode, control the signal generator to apply a first current between the source and sink electrodes, sense voltages at the first and second sense electrodes, and then automatically switch the operation mode from the normal mode to a shorted mode, while the measurement apparatus is operating in the shorted mode, control the signal generator to apply a second current simultaneously to both the source and sink electrodes, and sense voltages at the first and second sense electrodes, determine the calibrated bioelectric impedance based at least in part on: a voltage difference between the first and second sense electrodes in both the normal and shorted modes, a ratio of voltages at one of the first and second sense electrodes in the normal and shorted modes, and a third current across the current sense resistor in the normal mode, and output the calibrated bioelectric impedance.

8. The measurement apparatus according to claim 7, wherein the calibrated bioelectric impedance is determined by the following formula:

$$Z_2=(\beta_N-\beta_B*(\gamma_N/\gamma_B))/(\alpha_N/Z_6)$$

where $Z_2$ is the calibrated bioelectric impedance, $\beta_N$ is the voltage difference between the first and second sense electrodes in the normal mode, $\beta_B$ is the voltage difference between the first and second sense electrodes in the shorted mode, $\gamma_N/\gamma_B$ is the ratio of voltages at said one of the first and second sense electrodes in the normal mode and the shorted mode, and $\alpha_N/Z_6$ is the third current across the current sense resistor in the normal mode.

9. The measurement apparatus according to claim 7, wherein the controller is configured to:

set the operation mode to a reverse mode, and while the measurement apparatus is operating in the reverse mode, control the signal generator to apply a fourth current between the sink and source electrodes in a direction opposite to the first current, and sense voltages at the first and second sense electrodes.

10. The measurement apparatus according to claim 9, wherein the controller is configured to determine a first bioelectric impedance based at least in part on the voltages at the first and second sense electrodes in both the normal and shorted modes, and determine a second bioelectric impedance based at least in part on the voltages at the first and second sense electrodes in both the reverse and shorted modes, and the calibrated bioelectric impedance is determined using the first and second bioelectric impedances.

11. The measurement apparatus according to claim 10, wherein the calibrated bioelectric impedance is an average of the first and second bioelectric impedances.

12. The measurement apparatus according to claim 7, wherein each of the stimulation and sense electrodes is a dry electrode.

* * * * *